United States Patent

Daley et al.

[11] 4,171,129
[45] Oct. 16, 1979

[54] DOCUMENT TRANSPORT

[75] Inventors: William C. Daley, West Hartford; Andrew Hall, South Winsor; Arthur M. Sikes, Suffield, all of Conn.

[73] Assignee: Scan-Optics, Inc., East Hartford, Conn.

[21] Appl. No.: 809,692

[22] Filed: Jun. 24, 1977

[51] Int. Cl.² .............................................. B65H 5/22
[52] U.S. Cl. .......................................... 271/6; 271/10; 271/126; 271/136; 271/245
[58] Field of Search ...................... 271/6, 10, 113, 119, 271/121, 125, 126, 236, 243, 244, 245, 246

[56] References Cited

U.S. PATENT DOCUMENTS

| | | | |
|---|---|---|---|
| 672,529 | 4/1901 | Hunter | 271/245 |
| 1,837,241 | 12/1931 | Van Buren | 271/270 |
| 2,815,949 | 12/1957 | Faeber | 271/264 |
| 3,072,397 | 1/1963 | Kelchner | 271/245 |
| 3,517,923 | 6/1970 | Hoffman | 271/246 |
| 3,652,083 | 3/1972 | Bosshardt | 271/246 X |

Primary Examiner—Richard A. Schacher
Attorney, Agent, or Firm—Brumbaugh, Graves, Donohue & Raymond

[57] ABSTRACT

A document transport for a document scanning device has an elevator for locating a stack of documents to be fed automatically into position to be scanned. The top document is removed from the stack by a feed roller. Other documents which may become entrained with the top document are returned to the stack by separation rollers. The top document is driven into the scanning device against an alignment gate and this action eliminates any skew in the position of the document. At a read or scan station beyond the gate, which is reached by the document once the alignment gate has been withdrawn, the data on the document is scanned as the document is moved by read rollers in a controlled fashion. As the document leaves the read station it is trapped between the two single opposing belts in a buffer unit, which move the document at the spped of the scanning rollers. When the end of the document leaves the read station the buffer unit changes speed and the document is accelerated to a higher eject speed by the opposing belts. Upon leaving the buffer the document enters an ejector assembly consisting of a plurality of longitudinally aligned pairs of single opposing belts leading to an accept document stacker, where the scanned documents are stored. In the event a document cannot be properly scanned by the scanning device, a reject gate moves into the eject path and diverts the document to a reject stacker via an additional pair of single opposing belts.

14 Claims, 6 Drawing Figures

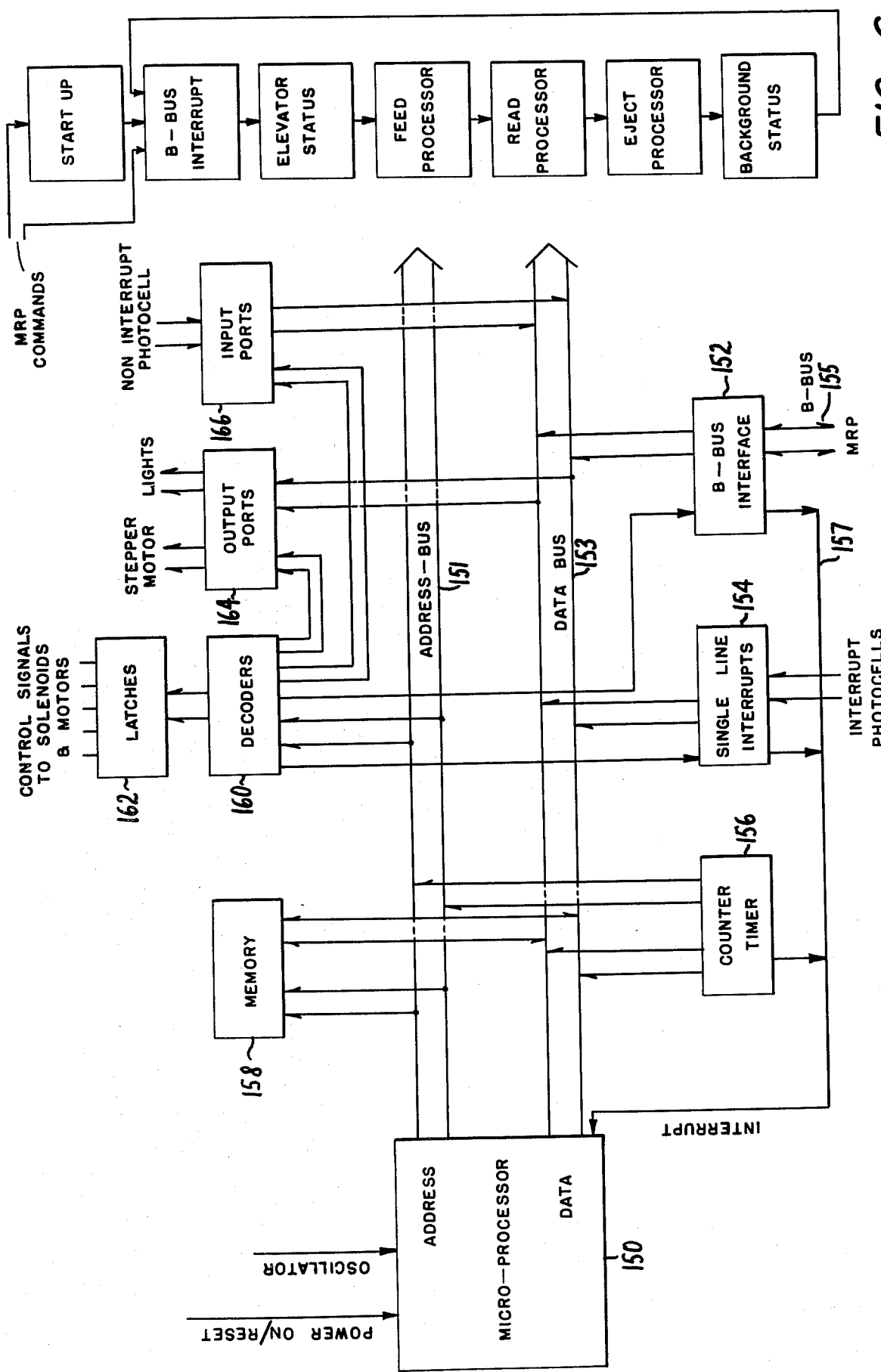

DOCUMENT TRANSPORT

BACKGROUND OF THE INVENTION

The present invention relates to document handling systems and, more particularly, to document handling systems in which information must be imaged from a document being transported automatically through a machine.

In document scanning devices, such as character recognition systems or microfiche, a good deal of time and effort can be wasted if it is necessary to locate each document by hand in a positon which will allow the information on the document to be read or copied. Either system usually requires segments of a document to be optically scanned and the difference in reflectance converted into an electrical signal. When a character recognition system is used the signal is converted into binary numbers that indicate whether part of a character or background is contained at various locations on the document. In a microfiche system, the optical image of the document is stored on film. In either case it is necessary for either the scan to move in a controlled fashion or for the document to do so. In the equipment of the present invention it is the document which is moved. However, in order to preserve the information carried by the document, its movement through the machine must be relatively slow. The throughput of prior systems has been limited to the maximum read rate of the system. Since the read station, especially in a character recognition system, can be several feet in length, such machines may be very slow indeed. When a document scanning device operates at a slow speed it is difficult to stack the scanned documents on a horizontal surface. Therefore, complicated inclined stack trays of relatively minor height have to be used. The low capacity of the stack trays requires the frequent emptying of them, thus further slowing the document reading operation.

Moreover, prior types of document elevators which position the documents for feeding into a scanning device require guides for accurately aligning for the document before it is fed into the machine in order to make sure that it is not skewed. Such document transport equipment has not heretofore had the capability of automatically deskewing or aligning the documents during their movement therethrough. Time is wasted therefore in manually aligning and checking the alignment of documents being stacked to be fed through the machine. Also, document elevators that provide edge registration, usually require the drive to be canted to force the document against a guiding edge. This tends to skew documents with high aspect ratios, such as checks.

The belt-type document carriers of the prior art generally include several narrow opposing belts on each side of the document in order to support it across its width. However, with this type of arrangement there is a tendency for the edges of the document to be caught by one of these belts, thus causing a paper jam with the attendant lost in operating time and perhaps damage to the document.

SUMMARY OF THE INVENTION

The present invention is directed to providing a document transport with a high throughput, which transport is unlikely to have paper jams, by providing an elevator that can be moved horizontally to center-register the document, automatic skew correction, a short document read station, and a variable speed buffer and a high speed ejection system using pairs of single opposing belts.

In an illustrative embodiment of the invention a stack of documents to be read is placed on an input elevator which automatically lifts the documents to the correct height. The elevator, or at least its tray and one side wall, is movable in the horizontal plane to center the documents under feed rollers. The stack of documents can be relatively high and is supported on more than one side while avoiding the problems of edgeregistered systems. The uppermost document is fed into the machine from the elevator tray by the feed rollers and lower documents attached to it, e.g. by friction or static, are separated from the top document by a pair of separation rollers located on the top and bottom of the document, respectively, and moving in opposite directions.

The elevator tray need not provide a complete guide for the stack of documents because any skewing of the documents is corrected as they are fed into the machine and driven against an alignment gate located perpendicular to the document path. The skew correction, through the use of the alignment gate, not only results in a simple elevator, but also reduces the chances of a paper jam in the area beyond the elevator.

A solenoid operated read roller engages the document and then the alignment gate is withdrawn. This set of rollers located at opposite ends of a read platen are driven at the read speed of the machine by a stepping motor. With this design the distance from the elevator tray to the last read roller is six inches or less. Since the paper can travel at high speed up to the alignment gate, it can be seen that the document is between the relatively slow moving read rollers for only a few inches and, hence, the throughput of the machine is not greatly limited by the scanning or reading operation.

Upon leaving the last pair of read rollers the document enters a buffer unit formed by a pair of rotating adjacent endless belts arranged one on top of the other so as to converge together to define a document conveying portion therebetween. The document enters and is trapped between the belts so as to be transported to a remote point at which the belts diverge. The arrangement is such that the belts engage the document generally along its center on each side. It has been found that only one belt on each side of the document need be utilized for conveying the documents successfully at high speeds. This poses no problem with respect to the support of the edges of the document and it reduces the chances of a paper jam.

As long as part of the document is in the read station the belts of the buffer unit move at the read speed; however, when the document passes the last pair of read rollers a clutch is engaged which causes the buffer belts to be driven at a high speed. This accelerates the document up to the speed of a similar document eject belt system following the buffer unit. The belts of the eject unit carry the document to a document accept stacker. Since the eject belts move at a high speed the document is given sufficient velocity to form a relatively high stack of documents on a horizontal surface, thus simplifying the stacker design and reducing the frequency with which the stack tray must be emptied.

If the machine is unable to read or scan the document, a reject gate is positioned by a solenoid in the eject path in front of the accept stacker and the document is directed between a further pair of drive belts, which transport the document at high speed to a reject stacker.

With the present invention a document scanning machine can have a high throughput because the slow speed read area is only a few inches long and the document is transported at high speeds in other areas of the machine. Also paper jams are reduced by the automatic skew correction and the use of pairs of single opposing belts.

BRIEF DESCRIPTION OF THE DRAWINGS

The foregoing and other features of the present invention will be more readily apparent from the following detailed description and drawings of an illustrative embodiment of the invention in which:

FIG. 5 is a schematic diagram of a control circuit for operating the document transport of the present invention; and FIG. 6 is a flow chart of the program for controlling the operation of the transport.

BRIEF DESCRIPTION OF THE PREFERRED EMBODIMENTS

DOCUMENT SUPPLY

Figure 1:
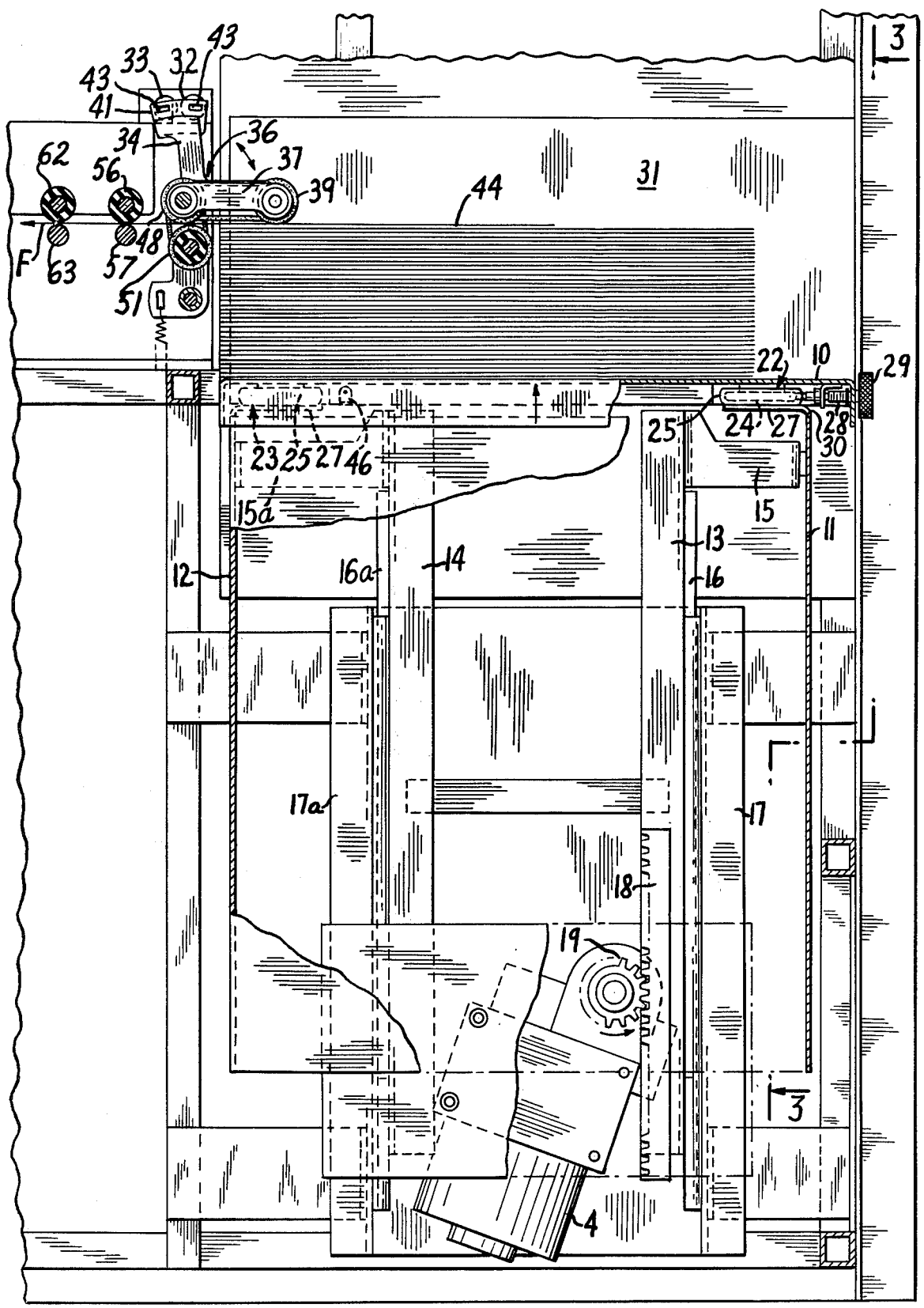
FIG. 1 illustrates a document supply elevator according to the present invention.
Figure 3:
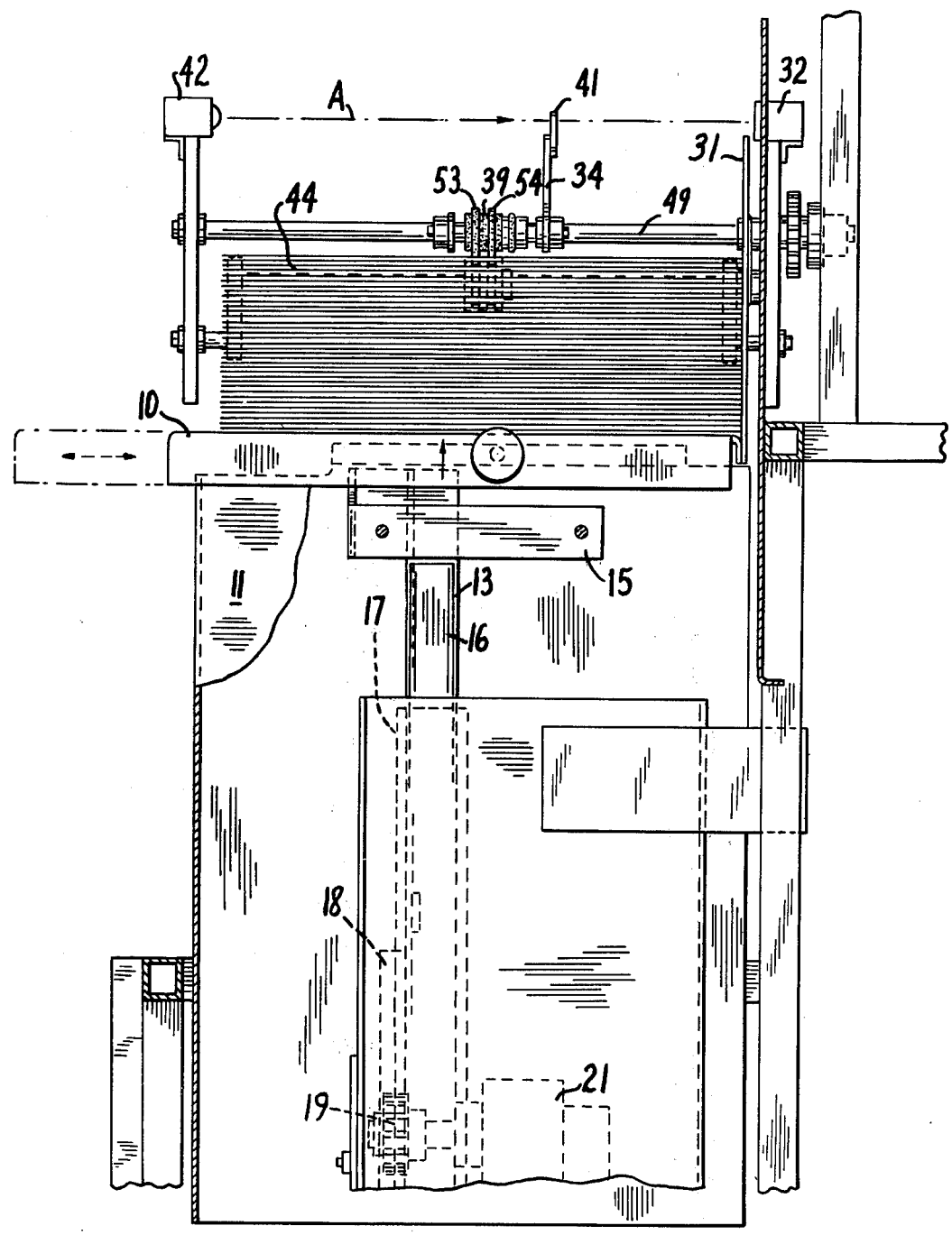
FIG. 3 is a view taken along the line 3—3 of FIG. 1.

Referring now to the drawings and in particular to FIGS. 1 and 3 which show, inter alia, the first or document supply stage of operation, the document transport according to the invention is provided with a movable supply platform or elevator tray 10 upon which documents to be read are stacked either manually or by deposit from automatic document conveyors such as chutes or inclined trays, which do not form a part of the present invention. The tray 10 forms the top of a movable elevator structure which includes vertical front and back support plates 11 and 12 secured respectively to vertically depending tray frame members 13 and 14 by means of horizontal connectors 15 and 15a. Each of the tray frame members defines a longitudinally extending slide portion 16 and 16a, respectively, adapted to ride within corresponding fixed and channeled main frame elements 17 and 17a. The tray 10 is thereby movable on the channeled main frame elements up and down between document feed and document load positions.

The depending frame member 13 may be provided with a vertically extending rack 18. The rack is engaged by a pinion 19 which in turn is connected through appropriate linkage to a motor 21 fixed to the main frame of the document handling machine. The pinion 19 is rotatably driven in either of two directions by the motor thereby enabling the rack and consequently the elevator tray 10 to be moved linearly up or down, as desired. The motor 21 is preferably of the bi-directional motor type which permits the pinion to be turned in either direction in discrete successive steps. The document tray is thereby indexed into successively higher and higher positions or vice versa and can be held in a fixed intermediate position. The tray is indexed in the full down position for loading of documents. The operational sequences of the motor and elevator tray are described in greater detail below.

In the preferred embodiment, a pair of horizontally extending slides 22 and 23 depend from the undersurface of the tray. They may each be provided with a slide plate 24, each of which rides along a corresponding upwardly directed slide surface 25 and 26 attached respectively on the top of horizontally inwardly directed projections 27 defined by the front and back support plates 11 and 12. As shown in FIG. 3, the tray may be moved horizontally outwardly to the position shown in broken lines. Alternatively, the slides 22 and 23 may be fixed and engageable by channel elements depending from the tray. Other similar modifications may be made in the tray structure without departing from the scope of this invention.

The tray is locked or retained in a selected position by way of threaded lock shaft 28, and its manipulating knob 29, carried by the tray and funtionally engageable with a fixed upstanding channel member 30 connected to the front tray support plate 11. In this way the tray may be moved horizontally to accommodate documents of different widths, for example, documents varying in width from three inches to nine inches. Document width calibrations may also be provided on the tray to enable visual preadjustment for document batches of varying widths. When the width of the document tray is properly adjusted to correspond to the width of a particular document batch, the documents located on the tray are properly centered for efficient movement through the machine, as described below.

Where the document batches are to be fed to the tray automatically, a suitable stack size sensing mechanism, such as a photocell and its associated circuitry (not shown) may be employed to provide a signal for interruption of the document supply when the stack resting on the tray reaches a predetermined height. Of course, height calibrations may also be carried by a portion of the tray or its surrounding frame to assist manual loading to the proper stack height.

As shown in FIG. 3, the vertically movable portions of the document supply elevator are preferably provided with wall members such as the wall 31. The flat surface area of the wall 31 faces toward and is adjacent to the document containment area of the tray. Thus document batches supplied to the tray may be jostled manually or even automatically against the wall members in order to orient preliminarily any document arriving to the stack in skewed position. Various techniques for automatically aligning the edges of stacked documents are known and need not be described herein in detail. The wall member 31 may be fixed to the tray or to the tray support plates 11 and 12 in any convenient fashion. In the present embodiment it moves horizontally with the tray so that the separately adjustable tray can accommodate a variety of document sizes.

Figure 2:
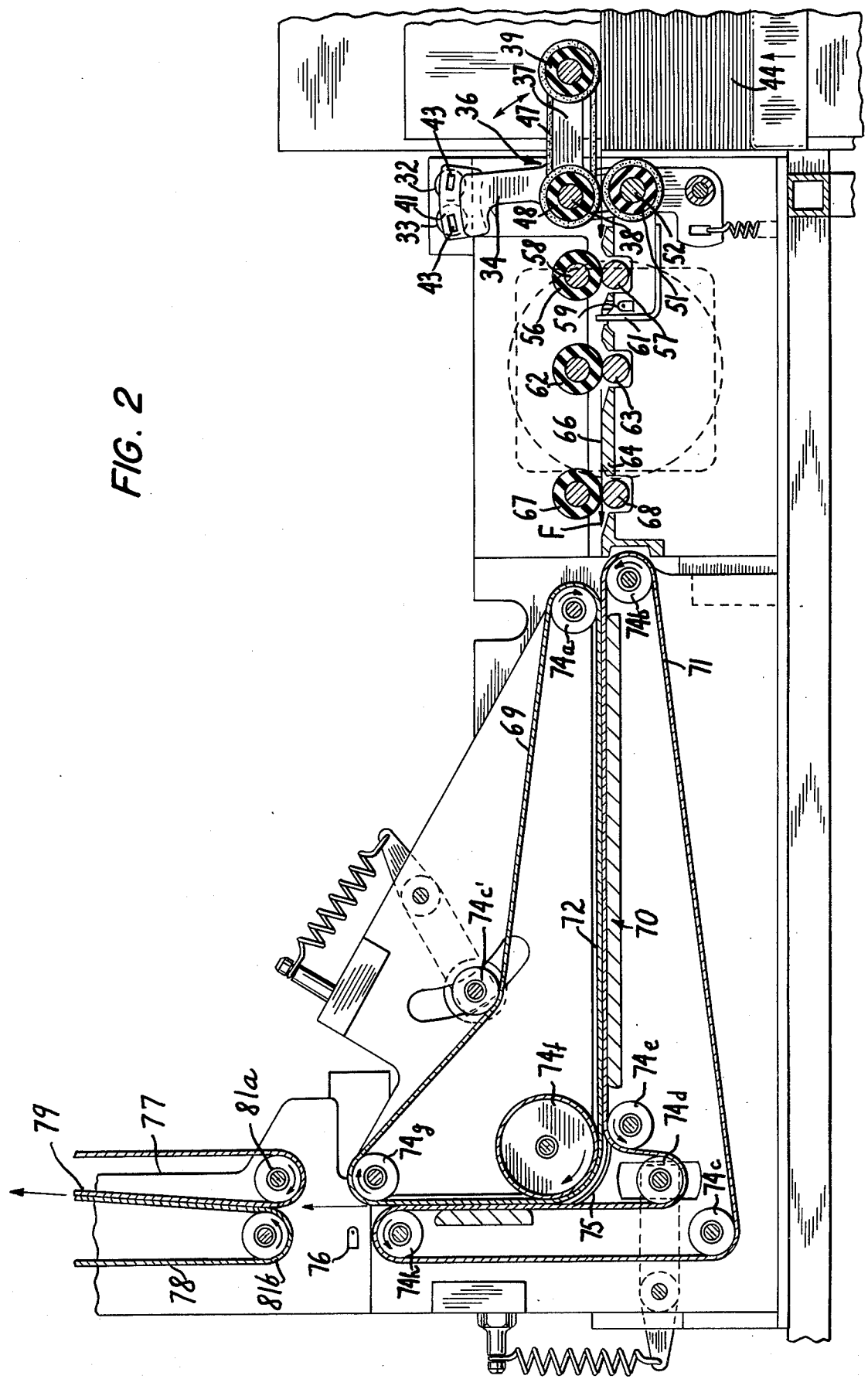
FIG. 2 illustrates a document alignment station, read station and belted buffer unit.

In accordance with the invention a document level sensing mechanism is provided for the purpose of cycling the motor 21 on and off in accordance with the document feed rate of the machine. In the present embodiment, with reference now to FIGS. 1 and 2, the document level sensors constitute a pair of photocells 32 and 33 fixed to the machine frame adjacent the top of a substantially vertically extending arm 34 of a rocker arm assembly 36 pivotally mounted on the frame. A second rocker arm 37 extends horizontally outwardly from the frame and over the elevator tray. The two arms 34 and 37 together define a generally L-shaped configuration, seen best in FIG. 2 which pivots on a horizontal axis 38. The assembly 36 may be resiliently biased so as to tend to pivot clockwise as seen in FIG. 2.

A document feed wheel 39 is rotatably carried at the distal end of the horizontal arm 37. As a result of the bias in the rocker assembly 36, the feed wheel rides on the top of a stack of documents carried by the elevator tray 10 to be fed into the machine. The wheel is moved up or down in response to a change in the height of the document stack thereby causing the rocker arm assembly 36 to pivot around the axis 38.

The distal end or top of the vertical arm 34 carries a vetical plate 41 which is aligned in the path of light beams originating from a source 42 and utilized to activate the photocells, as indicated by the arrow A in FIG. 3. The plate 41 is provided with a plurality of slots 43 oriented so as to be moved into the path of the light beams A. Accordingly, the light beams are either prevented from impinging on the photocells by the plate 41 or pass through the slots 43, depending on the position of the rocker arm 34. In this way, the photocells are able to register subtle changes in the position of the rocker assembly 36.

The output signals from the photocells 32 and 33 are registered and processed in accordance with enabling electrical circuitry described below to control the operation of the elevator motor 21. For example, when the tray 10 has been loaded with a stack 44 of documents to be fed into the machine, the motor 21 is turned on and the tray is indexed upwardly. When the top sheet or document of the stack 44 engages the feed wheel 39 the rocker arm assembly is pivoted counterclockwise, as viewed in FIG. 2. Such movement of the rocker arm assembly causes a change in the position of the arm 34. If the change is sufficient, the photocells will register a change in the light reaching them as a result of the plate 41 and its slots 43. A signal is thereby generated which cycles off the motor 21 to stop upward movement of the tray. The document feed operation of the device is then initiated and documents from the stack are fed one by one into the machine as described below. As the document stack is depleted its height decreases. The rocker assembly is, therefore, slowly pivoted in a clockwise direction (FIG. 2). This change in position of the arm 34 is sensed by the photocells and when the rocker assembly has been moved to a predetermined position the motor 21 is cycled on again to index the tray and document stack upwardly to the next successive feed position. Depending upon the thickness of the documents involved, each of the indexed feed positions of the document tray enables approximately three to four documents to be fed into the machine.

Where desired, an additional sensor such as a photocell 46 (FIG. 1) may be situated beneath an opening in the surface of the tray to provide a warning signal when the tray is empty. The feed operation is thereby automatically terminated as set forth below.

As a safety feature, a pair of travel limit switches (not shown) may also be provided to sense the position of the elevator tray 10 should it reach certain extreme positions as a result, for example, of failure in the motor control system. One such switch can be provided to establish a limit to the uppermost position that the document tray can reach without shutting off the motor control. The other switch correspondingly sets a limit to the lowermost travel position of the elevator tray. The switches initiate signals which cycle off the power to prevent damage to the tray or to the motor or the feed wheel assembly.

Document Feed

The feed wheel 39 rotates clockwise, as shown in FIG. 2, and, therefore, directs the top document on the stack 44 to the left and into the machine. The feed wheel is driven by an endless belt or chain 47 which interconnects the feed wheel and a separation roller 48 carried by the rocker assembly 36 and mounted for rotation about the axis 38. In the present embodiment, the axis 38 constitutes a drive shaft 49 suitably interconnected with a source of rotational energy such as the motor 21. The roller 48 and feed wheel 39 accordingly will rotate in the same direction and at approximately the same rotational speed.

A third roller 51 is mounted directly below and adjacent the roller 48 and is separately driven to rotate on its axis 52 in a direction opposite to the rotational direction of the roller above. The lower roller 51 is rotated at approximately half the speed of the upper roller and is arranged to define a small space between it and the roller 48 to enable passage therebetween of a single document removed from the stack 44. This space between the rollers 48 and 51 is such that the lower roller 51 will contact and push backward the bottom sheet if more than one document is removed at one time from the stack 44. Accordingly, only the uppermost document is permitted to pass between the rollers 48 and 51 and to enter the machine.

In accordance with the invention the circumference of the feed wheel 39 is provided with a pair of spaced apart radially outwardly projecting ridges 53 and 54 (FIG. 3). These peripheral ridges are of a predetermined minimal cross-sectional area and define the points of contact with the uppermost document on the stack 44. The ridges 53 and 54 reduce to a minimum the area of frictional engagement between the feed wheel 39 and the document to be fed to the machine. Accordingly, a document entering the machine under influence of the feed wheel may be swiveled about the contact area with the wheel for purposes set forth below.

Control of the operation of the feed wheel is preferably achieved by a clutch mechanism (not shown) which interconnects the drive shaft 49 and the motor 21. When the stack level photocells 32 and 33 register a proper document feed position for the rocker assembly 36, the clutch is cycled on and the feed wheel 39 rotates to pull the documents one after the other from the top of the stack 44. As the stack height decreases to initiate indexing of the elevator tray 10 as described above, the clutch is turned off to permit the motor to index the tray 10 upwardly. The feed wheel clutch is recycled on only after the photocells 32 and 33 register an operational condition in the orientation of the rocker assembly 36.

Document Alignment

A second pair of rollers 56 and 57 is located in the path of document travel inwardly of the separation rollers 48 and 51. These rollers are also located one above the other. The upper or pinch roller 56 rotates on its axis 58 and is mounted so as to be vertically movable up and down with respect to the lower roller 57 between spaced apart and contacting positions. The roller 57 is suitably driven to rotate generally counterclockwise as viewed in FIG. 2. Both rollers are substantially tangentially positioned with respect to the generally horizontal document travel path. In this embodiment the roller 56 is only an idler, although the invention need not be limited to that extent. A read station stepper motor, described below, is employed as a separate source of power for the drive roller 57 and other rollers in the read station of the machine.

A photocell 59 is fixed to the machine adjacent the document travel path inwardly of the rollers 56 and 57. It senses the presence of the leading edge of a document entering the machine under the influence of the feed roller 39. A vertically movable alignment gate 61 is mounted so as to extend across and to block the document travel path when it is in its upper position, as shown in FIG. 2. It protrudes above the document path sufficiently to engage and to interrupt inward movement of a document under the influence of the feed wheel 39. Where the frictional contact area between the feed wheel and a document being moved against the gate 61 is minimal, it has been found that the document will align itself with its leading edge parallel to the vertical blocking plane defined by the gate. Of course, the plane of the gate is oriented so that a document aligned with its leading edge parallel thereto is in proper position to be injected beneath and scanned by character recognition equipment 125(FIG. 4) situated above the document travel path further within the machine. The gate itself is preferably planar although it may, if desired, be formed of a plurality of upwardly projecting fingers defining a document blocking plane.

Detection of the leading edge of the document by the photocell 59 results in actuation of a solenoid (not shown) to move the pinch roller 56 downwardly to press the document between it and the lower roller 57 and to hold it in position to prevent skewing. The sequence of events initiated by the photocell 59 is timed, as described below, so that the document is first aligned by contact with the gate 61 and is then pinched or secured between the rollers 56 and 57.

Simultaneously with closing of the pinch and idler rollers 56 and 57, the gate 61 is dropped out of the path of the properly aligned and secured document. This is accomplished by signalling the gate actuating solenoid as discussed in detail below. Rotation of the roller 57 is thereafter initiated to move the document forward across the gate 61 in the direction of the arrow F, in FIG. 2. Upon sensing the trailing edge of the document the photocell 59 issues an appropriate signal to the solenoids to enable resetting of the pinch roller 56 and the alignment gate in preparation for the next document. In the preferred embodiment, the solenoids are simply deactivated. This enables a suitable spring return mechanism (not shown) to act on the pinch wheel 56 to move it into spaced relationship with respect to the roller 57. At the same time the alignment gate 61 is reset so that the next document fed between the rollers 56 and 57 strikes the gate as described above.

As a safety feature, the photocell 59 is electrically connected with a timing mechanism described in detail below in such a way that its failure to register the leading edge of a document within a predetermined period of time results in a shut down of the document feed operation.

In general, the alignment gate and the pinch roller 56 are actuated synchronously. In some cases, however, particularly involving short documents, the pinch roller may be deactivated separately as the document trailing edge passes the photocell 59.

Document Read

A third set of vertically aligned pinch rollers 62 and 63 is located on the other side of the gate 61 from the rollers 56 and 57. Both of the rollers 62 and 63 are situated substantially tangentially with respect to the path of document travel, shown by the arrow F, with the drive roller 63 below the document path. In this embodiment the roller 63 is driven by the read station stepper motor to rotate counterclockwise as viewed in FIG. 2 so that documents are injected to the left as shown by the arrow F. The roller 62 is merely an idler pinch roller. The space between the second and third sets of rollers is preferably less than the length of a document to be read or scanned by the machine. Thus a document being moved under the influence of the rollers 56 and 57 will be injected between and come under the influence of rollers 62 and 63 prior to disengagement from the former set of rollers. In this way the document orientation is stable as it is moved through the machine.

A platen 64 is positioned inwardly from and with one end adjacent to the rollers 62 and 63. It has a flat upper surface 66 which defines support for a document to be scanned at this point within the machine. Elements of a character recognition system useful with the present invention are described in detail in copending applications Ser. No. 809,697, now U.S. Pat. No. 4,120,049 and Ser. No. 809,695, now U.S. Pat. No. 4,122,443, to Thaler, to Thayler filed concurrent herewith, which system includes an optical read system 125 (FIG. 4) situated substantially vertically above the platen 64. The system is such that a reading area of a width of 1/144 inches by 10 inches is scanned successively as the document is moved under the influence of the stepper motor.

A fourth set of vertically aligned rollers 67 and 68 is located adjacent the other end of the platen 64. This set of rollers is substantially identical in function and situation with the rollers 62 and 63. The platen is quite short in the horizontal plane so that a document can be engaged simultaneously by both sets of rollers. While the length of the platen might vary, the distance between the parallel sets of rollers is always such that no document to be read by the machine can be positioned on the platen without being engaged by one of the roller sets adjacent thereto.

In the present embodiment, the read station stepping motor is a variable speed two direction motor. As set forth above it provides power for rotating the drive rollers 57, 63 and 68. The motor is preferably a 200 step per revolution, four phase stepping motor. The motor is run in a two phase on, two phase off single step operation. Control over the stepping motor direction and the stepping rate is achieved by four bit output generated within appropriate circuitry described below.

The drive rollers 63 and 68 in the read station and the drive roller 57 in the alignment station are interconnected to establish appropriate synchronization. Suitable drive belts (not shown) may be utilized for this purpose. A drive train (not shown) interconnects the stepper motor and the drive rollers of the read station. The interconnecting drive linkage and the diameter of each of the drive rollers is such that one step of the motor moves a document in the read station approximately 1/144 inches. This distance may be defined as one scan unit and its importance is explained in the foregoing copending applications.

Documents which are not legible to the scanning apparatus and supporting equipment can be reverse driven. This is accomplished when the read station stepper motor is signaled, as described below, to reverse the drive direction of the lower pinch rollers. The document is thus backed up for one line and then the unit attempts to re-read the line. When the document is driven back the elevator tray 10 is lowered slightly to prevent the document from hitting the stack of paper.

Document Eject

One end of each of a pair of endless conveyor belts 69 and 71 is situated adjacent the read roller pair 67 and 68 and on the opposite side thereof from the platen 64. The belt 69 is positioned directly above and engaging the belt 71 to define an interface section 72 between adjacent substantially flat portions of the belts. The belts turn at the same speed and in opposite directions. The interface 72 serves as a raceway along which documents injected out of the read rollers 67 and 68 are carried away. The raceway between the belts is horizontally aligned with the document travel path represented by the arrow F in FIG. 2 and is preferably supported by a flat elongated metal platen 70 extending beneath the horizontal section of the lower belt 71. The metal helps to prevent the build up of an undue charge of static electricity as the document is carried along at the relatively high eject speeds. The separation between the proximate ends of the belts 69 and 71 and the read roller pair 67 and 68 is such that a document might be engaged simultaneously by the belts and the rollers.

In the present embodiment, the belts 69 and 71 are driven at two speeds, controlled by a pair of conventional high speed and low speed clutches (not shown). The clutches are interconnected between a document eject drive motor (not shown) and the belts, and suitable mechanical linkage (not shown) is employed to effect movement in the belts. Control over the clutches is exercised by appropriate circuitry described in detail below. When a document is being read by the aforementioned video or optical system, the low speed clutch is engaged to cause the belts 69 and 71 to move at the read speed, that is identical with the rotational speed of the drive rollers 57, 63 and 68.

Upon departure from the read area, the trailing edge of a document is detected by an optical read system 125. The read system produces an electrical signal which actuates the high speed clutch to initiate a change in speed in the drive belts after a period of time for the document to clear the last read rollers. Appropriate electrical and logic circuitry described below insures that only one of the two clutches is operable at one time. The high speed clutch is automatically turned on as the document leaves the read station and is turned off upon entry to the read station of the next successive document to be read.

The belts 69 and 71 extend to a fixed point away from the read roller pair 67 and 68. In the present embodiment, the belts are oriented in a space efficient substantially L-shaped configuration. Thus documents are moved away from the read rollers in a generally horizontal direction within the raceway and are then turned to move generally vertically upwardly as shown in FIG. 2. In the configuration of the belts 69 and 71 shown in FIG. 2 a curved document guide 75 is provided in the document path at the end of the horizontal raceway interface 72 and before the corresponding vertical raceway also defined by the belts 69 and 71. This permits the document to be guided around the corner. Its momentum developed while it was within the horizontal raceway carries the document across the guide 75 and into the vertical raceway. A plurality of drive and idler rollers 74a-i may be utilized in conventional fashion to orient the configuration of the conveyor belts 69 and 71 as desired.

As an additional safety feature, a photocell 76 is positioned adjacent the fixed distal end point of the belts 69 and 71. It detects the leading edge of each document passing out of the raceway at that point. Appropriate timing circuitry described below senses the output response of the photocell. If a document does not emerge from between the belts 69 and 71 within a predetermined period of time, a signal is generated which results in a shut-down of the machine.

Figure 4:
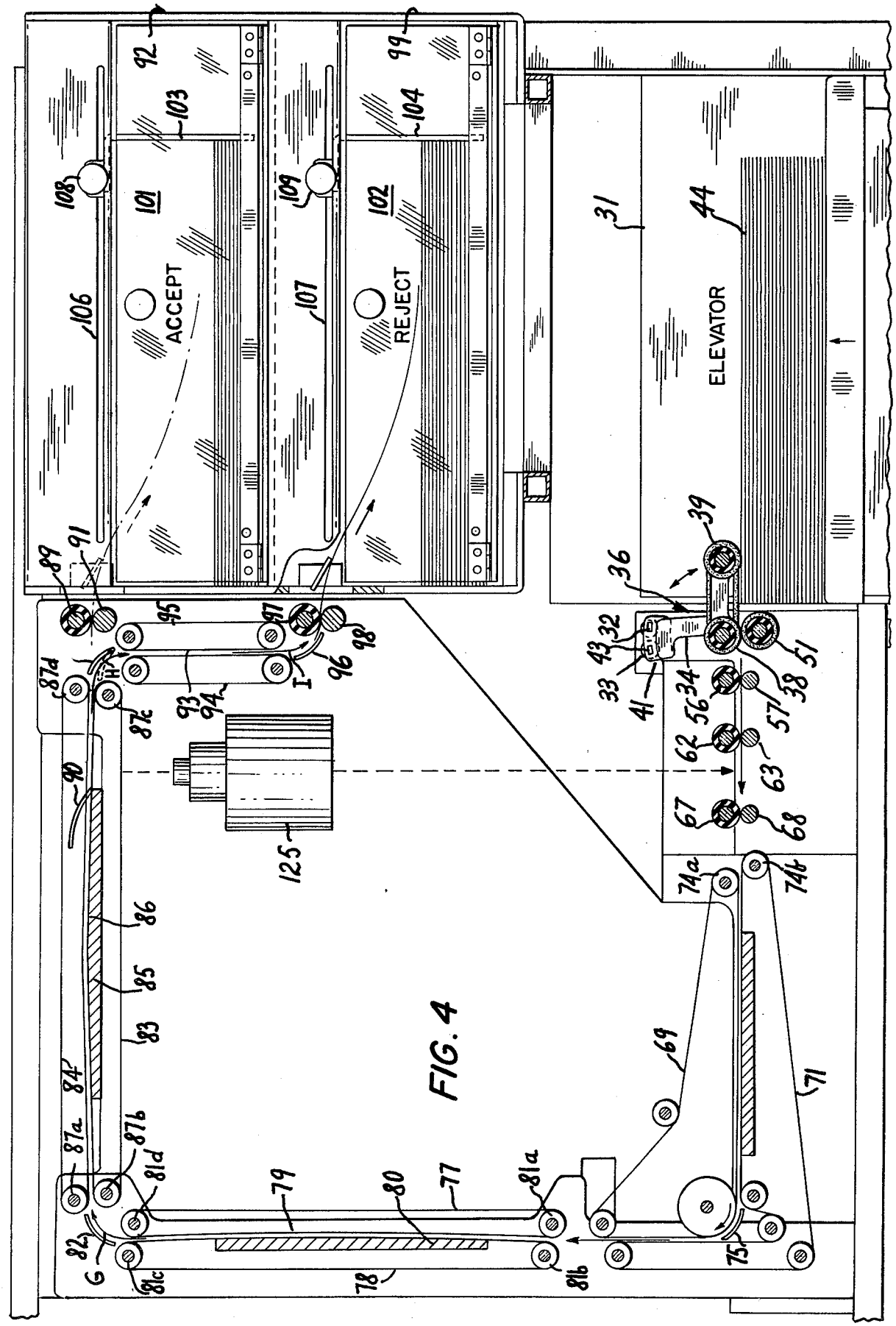
FIG. 4 illustrates a document eject and stacker area according to the invention.

Referring now to FIG. 4, the document eject station of the present machine is further illustrated schematically. A second pair of conveyor belts consisting of vertically arranged side-by-side belts 77 and 78 is provided to intercept documents ejected from between the belts 69 and 71. The belts 77 and 78 form a complementary vertical raceway 79 for gripping the individual documents. A vertical metal platen 80 similar to the platen 70 is associated with the raceway 79 for similar reasons. The second pair of belts, of course, turn at the same high speed as the belts 69 and 71. Drive and idler rollers 81a-e are provided to orient the belts 77 and 78 in the desired configuration and to turn them in opposite directions. Conventional belt drive linkage (not shown) interconnects the conveyor belt systems to the eject motor.

The belts 77 and 78 extend to a fixed point away from the belts 69 and 71. There a second curved guide 82 is provided to intercept and deflect documents ejected from the raceway 79. The guide 82 redirects the direction of document travel from generally vertical to generally horizontal, as shown by the arrow G, and is located between the ends of belts 77 and 78 and the ends of a third pair of conveyor belts 83 and 84. The belt 84 is positioned directly above and engages the lower belt 83 which turns at the same speed in the opposite direction. A complementary raceway 86 is formed along the interface portions of the belts 83 and 84 for gripping and carrying the individual documents ejected from between the belts 77 and 78 and striking the curved guide 82. The raceway 86 is likewise supported by a metal platen 85. The belts 83 and 84 are turned at the same document eject speed of the other conveyor belts. A plurality of drive and idler rollers 87a-e may be utilized to provide the desired belt configuration.

The belts 83 and 84 extend to a fixed point remote from the preceeding conveyors. A pair of wing elements 90 are positioned adjacent the raceway 86 on each side of the belts 83 and 84. Each wing element is oblique to the direction of travel of a document within the raceway. The wings are positioned so as to engage the edges of a document being carried in the raceway and tending to curl upwardly out of the horizontal plane. Such document edges are forced down to a relatively level position by the wings thereby minimizing the possibility of a jam resulting upon movement of the document into a storage bin as described below.

A curved deflector 88 is pivotally mounted adjacent the ends of the belts 83 and 84 in such a way that it may be moved into and out of the path of documents ejected from the raceway 86. The position of the deflector when it is out of the path of document travel is indicated in phantom in FIG. 4.

A pair of vertically aligned pinch drive rollers 89 and 91 is located behind the deflector 88. The rollers are located, respectively, above and below the path of document travel defined by the raceway 86 and are substantially tangential thereto. The arrangement is such that documents passing over the deflector 88 enter between the rollers 89 and 91 and are thereby driven out and into a first storage bin 92 in which the documents are collected in a horizontal stack.

When the front edge of the deflector is pivoted upwardly, or clockwise as viewed in FIG. 4 so that it is in the path of documents ejected from the raceway 86, e.g. to the position shown in solid lines, the documents are deflected downwardly, as indicated by the arrow H. At that point they enter a raceway 93 defined between a fourth pair of adjacent conveyor belts 94 and 95. The belts 94 and 95 are similar to the preceeding conveyor belt pairs and turn at the same eject speed in opposite directions. They extend generally vertically to a fixed point remote from the deflector 88 at which a fixed guide 96 is positioned to intercept documents ejected from the raceway 93.

The guide 96 defines an eject path for deflected documents, as shown by the arrow I. Another pair of vertically aligned drive pinch rollers 97 and 98 is arranged with the rollers located respectively above and document travel path and substantially tangential thereto. Documents intercepted by the guide 96 are deflected between the rollers 97 and 98 and are thereby driven out and into a second storage bin 99 in which they are collected in a horizontal stack similar to the stack developed within the bin 92.

In the present embodiment, each of the bins 92 and 99 is provided with a transparent pivotally mounted door 101 and 102, respectively. This permits manual access to the bins to remove the collected documents. Each of the bins is also provided with respective horizontally movable vertical wall members 103 and 104. The walls 103 and 104 slidably engage corresponding upper horizontally extending track elements 106 and 107 within the bins. Handles 108 and 109 are provided for respective adjustment of the walls in any desired position along the track to accommodate documents of different dimensions.

In the present embodiment, the pivotal deflector 88 is operated by a conventional solenoid (not shown) which responds to signals generated by the character recognition and scanning controls. Acceptable documents are collected in bin 92. For such documents the deflector is pivoted to the lower position shown in phantom in FIG. 4. Acceptable documents ejected from the raceway 86 pass over the top of the deflector 88 and are driven by rollers 89 and 91 into the "Accept" bin. Rejected documents, on the other hand, cause the deflector to be pivoted up to the position shown in solid lines. They are accordingly deflected down into the raceway 93 and from there through the rollers 97 and 98 and into the "Reject" bin 99. As a safety feature, photocells (not shown) may be located adjacent one or more of the deflectors 82 and 88 to register the presence of a document emerging from the corresponding raceways 79 and 86. Timing circuitry described below initiates a machine shut down should the photocells fail to register an emerging document.

TRANSPORT CONTROL

The control of the foregoing document transport mechanism will depend on the type of system of which it is a part. With a simple scan system, the control is very simple. The operator merely pushes a button to start the feeding of documents. Photocells described above and located throughout the machine indicate the position of the document and the signals from the photocells can be combined in logic circuits to indicate paper jams and to assure that a new document is not fed into the system prematurely.

If the transport system is part of a character recognition system its control is much more complicated. In particular, it is often desirable to backup the document to re-read a line. With this added complexity, it is easier, less expensive, and more flexible if the control of the transport is by means of a program, rather than by logic hardware. An arrangement of devices for providing program control of the transport is shown schematically in FIG. 5 and a flow chart of the major subroutines of the program is shown in FIG. 6.

The basic element of the transport control is a microprocessor 150, such as Zilog-Z-80. The structure, operation and codes for the Z-80 are described in the "Z80CPU Technical Manual" by the Zilog Corp., 1976, pertinent portions of which are incorporated herein by reference. With the arrangement shown in FIG. 5 the micro-processor is organized on a bus basis with an address bus 151 and a data bus 153.

The micro-processor 150 receives instructions from the controller of the system of which it is a part, e.g., a micro-recognition processor (MRP) for a character recognition system. Elements of a character recognition system in which the present transport is particularly useful are described in copending patent applications Ser. No. 809,697 now U.S. Pat. No. 4,120,049 to Thaler et al. and Ser. No. 809,695, now U.S. Pat. No. 4,122,443 to Thaler et al., filed concurrently herewith and assigned to the assignee of the present invention. This data is applied over a B-bus 155 for the MRP and is received in a B-bus interface 152. In the interface the address for the transport control is acknowledged and decoded. This can be done with integrated circuits DM 8160. The input from the MRP can be stored in the interface in integrated circuit register files, such as integrated circuit No. 74LS670, and applied to the data bus 153. When the data is stored in the interface an interrupt signal is sent via line 157 to the micro-processor to let it know that the data should be read. If data is to be read out of the micro-processor to the MRP, it is placed on the data bus and is stored in latches, e.g. units No. 74LS175, in the interface for reading by the MRP. Naturally various buffers and drivers can be provided in the interface for conditioning MRP signals for application to the micro-processor.

The MRP instructions would tell the transport, for example, when to read a document or to backup a line because it was unable to read it the first time. The program of the micro-processor converts these macro instructions into the signals necessary to cause the motors, switches, and solenoids of the transport to function in the proper sequence.

During startup of the system the program for the micro-processor is supplied from the MRP over the B-bus interface to the micro-processor, which stores it in a memory 158. The memory has a boot loader program stored in a programmable read only memory (PROM), e.g. two units No. 7621, which initialize the transport and allow loading of the memory, e.g., random access memory (RAM) units No. 4804A.

The micro-processor is arranged to function on an interrupt polling basis, i.e. the program poles the various functions in a repeated loop as shown in the flow chart of FIG. 6, until an interrupt occurs. Most of the interrupts are handled by a single line interrupt circuit 154. The interrupts controlled by this circuit include the outputs of some of the photocells in the transport. The micro-processor loads information into mask latch devices, e.g. 74LS175 units, in the interrupt circuit, which information determines which interrupts are to be looked at. The interrupts and the outputs of the mask latches are ANDed and the outputs are applied to priority encoders, e.g. units No. 74148, that give the correct priority to the interrupt. From the encoders these signals are applied to a PROM that places the address of the service routine in the program that handles that interrupt on to the data bus. Therefore, an interrupt, e.g. from a photocell, that occurs at a time when the micro-processor is looking for it, will supply the micro-processor with an interrupt signal and will place the address for the subroutine which will handle the interrupt (interrupt vector) on the data bus, where the micro-processor can read it.

As will be explained in more detail, the transport control also requires a counter timer 156 for timing certain sequences in the operation of the transport. This timer circuit can be a series connection of Z80-CTC units which will provide up to 25 milliseconds of timing. Each such unit includes count-down counters, latches and control circuits. During operation of the program a number representing a particular time is loaded into the counters and an interrupt vector, i.e. the address of the sub-routine for handling the interrupt, is loaded in the latches. Then an internal oscillator signal is fed from the micro-processor to count down the counter. If it reaches zero an interrupt signal is sent to the micro-processor and the interrupt vector data is applied to the data bus 153. Such an operation might occur if the document is given a certain time to travel between two photocells and it has not reached the last one at the end of the allocated period.

In carrying out the instructions of a sub-routine activated by an MRP command or an internal interrupt, the address for the device to be read is supplied to decoders 160. These decoders convert the address into single line signals that operate the motors, solenoids and lights of the system. The decoder can be 74LS138 and 74LS154 units. When the signals are to be applied to the various solenoids of the system, e.g. the alignment gate solenoid, and to the motors for the elevator, buffer and eject systems, they are stored in latches 162, e.g. 74LS279 units. The decoder, however, also controls output ports 164, which are latches that control panel lights and the stepping motor for the read rollers. As was stated previously the stepper motor gets a fourbit code from the micro-processor which will increment it one step forward or backward. Inputs from the photocells and the switches, e.g. door open switches, are received in an input port 166 which is a series of gates activated by the decoders 160. Suitable buffers and drivers are supplied to convert the inputs and outputs to circuits 162, 164 and 166 to the levels received from or needed by the motors, switches and solenoids of the transport.

The flow chart of the program in the micro-processor is shown in FIG. 6. From the arrangement of the flow chart, it can be seen that the program operates in a polling fashion. When the system is turned on, a start-up procedure is performed which initializes the system with the help of the PROM in memory 158. Then the program begins to loop through the various stages until a command for some action is sent by the MRP. This sets a flag in the program via the B-bus interrupt routine. When the program skips to the routine whose flag is set, it begins to perform some function and does not simply pass the program onto the next step.

After checking for a B-bus interrupt, the program checks the status of the elevator. Three photocells are associated with the elevator. One, photocell 46 (FIG. 1) located in the elevator tray, determines if there is paper on the tray and the other two, photocells 32 and 33 located on the feed rocker assembly control the height of the elevator so that the paper stack is at an appropriate position for feeding in documents. When the system needs to re-read a document, the elevator is lowered to prevent the paper which is backing up from running into the paper stack 44. Also, as documents are fed into the machine the height of the elevator is adjusted to keep the top document in the correct position.

When the micro-processor activates the feed process, the passage of the paper into the unit is sensed by a photocell 59 just before the alignment gate 61. The interrupt generated by the paper passing this photocell starts a timing sequence which ends when the paper should have been aligned on the gate, approximately fifteen steps of the read station motor. The end of this timing activates the solenoid of the pinch roller 56, so that the paper is gripped, and lowers the alignment gate. Another interrupt is generated when the document enters the read station because information is received in the video unit. A timing of the arrival of video from the removal of the alignment gate is performed in the timer 156 to make sure that there has not been a paper jam. At this point, the program is executing the read sub-routine.

Upon the termination of video, indicating that the document has left the read area, a new timing period is set in timer 156 and an interrupt representing the end of this period is used to set the buffer belts 69 and 71 into the high speed eject mode. This time period is required to give the document time to clear the last pair of read rollers 67 and 68 before the eject belt speed is changed. Photocell 76 and others are also located respectively at the end of the eject belts 69 and 71 and at the entrance to both the "Accept" and "Reject" bins 92 and 99. Under control of the program and with the use of timer 156, the movement of the document past these points is measured. These operations are under the control of the eject subroutine.

The background status sub-routine is used to check if there are paper jams or door open condition, etc. Once this is checked the program cycles back to check for a B-bus interrupt. Normally only one sub-routine will be active during any cycle through the main program and each cycle increments that subroutine through various modes of the sub-routine until it is complete and the flag for the next sub-routine is set. Failure of an expected interrupt from a photocell to occur within the alloted time generates timer interrupts that are an indication of a paper jam and the program will cause the transport to stop.

The photocells particularly those in the read station of the machine can also be used as a double document detector. Since a certain amount of light passes through the document it can be used as a measure of the thickness of the document. When the light is less than expected it is an indication that more than one document is present. This detection is best done with the photocell 59 in front of the alignment gate. As an alternative two or more documents can be detected as described in copending patent application Ser. No. 809,694, now abandoned of Brazeal, filed (concurrently herewith) and assigned to the assignee of the present invention. The alignment gate photocell can also be used to detect the presence of two documents entrained together by checking its length, related to the number of steps of the read station stepping motor, while the document is over the photocell. If the document measures more than two inches longer than the known length, an error is indicated.

While the invention has been particularly shown and described with reference to preferred embodiments thereof, it will be understood by those skilled in the art that various changes in form and details may be made therein without departing from the spirit and scope of the invention.

What is claimed is:

1. Apparatus for successively transporting center registered documents one at a time from a first stack of documents to a second stack, comprising:

elevator means for lifting said first stack of documents to a feeding position;

extracting means for successively extracting the topmost document from the first stack when it is in the feeding position, said extracting means including a rotatable alignment member having a surface area engageable with the center axis and of the document, the area of contact between said rotatable alignment member and the document being such that the document can swivel upon extraction from the stack with the area of contact as the pivot point;

a document orienting means for aligning the center registered documents including a movable wall member responsive to the movement of a document from said first stack so as to be positioned to intercept the document in such a manner that the leading edge of the document engages the wall member, the position of said wall member being such that the document is simultaneously engaged by the wall member and by the rotatable alignment member of the document extracting means, whereby the document is aligned parallel to the wall member by being driven against it by said rotatable alignment member; and a moving conveyor for transporting aligned documents to said second stack.

2. The apparatus of claim 1 in which said document orienting means further including a pair of vertically aligned rotatable rollers between the first stack and said wall member and adapted to engage and to hold the document on both sides following interception by said wall member.

3. The apparatus of claim 2 further including means responsive to alignment of the document with said wall member for retracting said wall member to permit transport of the aligned document to the conveyor by said pair of vertically aligned rollers.

4. The apparatus of claim 1 in which said rotatable alignment member comprises a rotatable feed wheel having a generally cylindrical surface area defining at least one raised peripheral rib section successively engageable with the topmost document on the stack, whereby the document is permitted to swivel with respect to the feed wheel upon extraction from the stack.

5. The apparatus of claim 4 in which said cylindrical surface defines a pair of spaced apart peripheral rib sections of substantially equivalent size.

6. The apparatus of claim 1 in which the conveyor comprises at least one pair of single opposed endless belts rotating in opposite directions with the same speed and defining a raceway therebetween for gripping the center of a document wider than the belts on opposite sides thereof and transporting it at the rotational speed thereof.

7. The apparatus of claim 6 comprising at least one fixed flat metal platen adjacent and substantially coextensive with said raceway for supporting the sides of the document that extend beyond the raceway.

8. The apparatus of claim 7 comprising a pair of wing-shaped plate elements, one on each side of and adjacent said raceway, each of said elements having lower ends substantially in the plane of said raceway and being located toward the rear of the wing-shaped elements in the direction of travel of the document, the rest of said wing-shaped plate extending obliquely away from said plane to form upper ends toward the front of the wing-shaped elements, said wing-shaped elements acting on the sides of the document that extend beyond the belts to align them with the raceway.

9. The apparatus of claim 6 in which the conveyor comprises at least two tandomly arranged conveyor sections, each section including a pair of said belts, the corresponding raceways being aligned so that a document ejected from one raceway enters the other.

10. The apparatus of claim 9 in which the raceways are oblique to each other and a curved document guide is located between the conveyor sections to deflect a document ejected from one section into the raceway of another section.

11. The apparatus of claim 10 including a clutch mechanism connected to one of said sections to permit rotation thereof at more than one speed.

12. The apparatus of claim 1 wherein said document extracting means further includes a pair of vertically aligned separation rolls located adjacent the end of the first stack, the upper separation roll rotating to move the document forward and the lower separation roll rotating in the opposite direction, said separation rolls being spaced apart by a distance approximately equal to the thickness of the thinnest single document expected so that the uppermost document may be separated from a document beneath it in the first stack.

13. The apparatus of claim 3 wherein said vertically aligned rollers can be rotated to move the document back to the first stack and further including means for lowering the elevator when the document is moved back to the first stack.

14. The apparatus of claim 1 further including at least one stacker bin having horizontally movable vertical walls for adjustment to the size of the document and supporting said second stack.

* * * * *

UNITED STATES PATENT AND TRADEMARK OFFICE
CERTIFICATE OF CORRECTION

PATENT NO. : 4,171,129
DATED : October 16, 1979
INVENTOR(S) : Daley et al.

It is certified that error appears in the above-identified patent and that said Letters Patent are hereby corrected as shown below:

Column 1, line 42, delete "for" (second occurrence);
Column 2, line 25, "simple" should read -- simpler --;
Column 5, line 14, "vetical" should read -- vertical --;
Column 8, line 30, delete "Tha-";
Column 8, line 31, delete "ler, to";
Column 11, line 29, after "above and" insert -- below the --;
Column 15, line 34, delete "and".

Signed and Sealed this

Fourth Day of March 1980

[SEAL]

Attest:

Attesting Officer

SIDNEY A. DIAMOND

Commissioner of Patents and Trademarks